United States Patent [19]

Morton

[11] 4,326,335
[45] Apr. 27, 1982

[54] METAL SHEARS
[76] Inventor: Ray E. Morton, 653 N. 1200 W., D101, Salt Lake City, Utah 84101
[21] Appl. No.: 193,037
[22] Filed: Oct. 2, 1980
[51] Int. Cl.³ .............................................. B26B 13/28
[52] U.S. Cl. ........................................ 30/254; 30/261
[58] Field of Search ................. 30/254, 255, 256, 261
[56] References Cited

U.S. PATENT DOCUMENTS

| | | | |
|---|---|---|---|
| 300,153 | 6/1884 | Starks | 30/256 |
| 643,539 | 2/1900 | Rowe | 30/256 |
| 1,529,237 | 3/1925 | Brcecinski | 30/256 |
| 2,192,725 | 3/1940 | Williams | 30/255 |
| 2,651,227 | 9/1953 | Kennington | 30/256 X |

*Primary Examiner*—Jimmy C. Peters
*Attorney, Agent, or Firm*—B. Deon Criddle

[57] ABSTRACT

Shears suitable for cutting sheet metal and other materials and having a pivoting handle and multiple blades to facilitate the making of a variety of useful cuts. The shears includes two handles and two pivotally connected blades. One handle provides a rigid continuation of a generally V-shaped blade; the other handle is free to swing between extreme positions through an arc of about 180 degrees. The swinging handle pivots on a pivot pin carried by one of the blades. The other blade has a pair of cutting edges to provide scissor action with the cutting edges of the V-shaped blade. A pivot pin extends generally transversely to and is located between the cutting edges at one side of the other blade, and the pivoting handle is free to swing thereon. Scissor action results as the pivot pin transfers the applied moment caused by squeezing the swinging handle relative to the other handle to the other blade to thereby rotate the blades relative to one another.

3 Claims, 4 Drawing Figures

METAL SHEARS

BRIEF DESCRIPTION OF THE INVENTION

1. Field of the Invention

This invention relates to reversible shears and scissors:

2. Prior Art

As described in U.S. Pat. No. 439,323, in the past the primary purpose of reversible scissors and shears has been to increase the number of available cutting surfaces to thereby decrease the need for frequent resharpening of the blades. Since this purpose does not require frequent or rapid change of the cutting surfaces, the blades were commonly joined together by a bolt or screw. In order to change the cutting surface, the blades had to be unbolted and realigned with the new cutting surface in the proper position. Examples of such connections are disclosed in U.S. Pat. Nos. 439,323 and 827,531. The present invention constitutes an improved means for quickly and efficiently changing the cutting surface, and therefore, greatly facilitates the making of certain cuts desirable to those skilled in the art.

SUMMARY OF THE INVENTION

A prinicpal object of the present invention is to provide readily reversible shears for convenient use in making right or left-hand cuts.

Another object is to provide shears facilitating certain other normally awkward cuts useful to those skilled in the art.

Principal features of the present invention include two handles and two pivotally interconnected blades. One handle forms a continuation of a flat V-shaped blade having legs of the V providing cutting surfaces and terminating at a common tip. The other handle is free to pivot through a 180 degree arc about a pivot assembly fixed to the other blade. The other blade has a pair of continuous cutting edges, each of which will provide scissor action with one of the sharpened surfaces of the V-shaped blade. Ears project from one flat surface of the other blade, and a pivot pin extends between the ears. The pivot pin is aligned with the axis of the pivot connection between the blades and extends normal to the longitudinal axis through the pivoting handle. One end of the pivoting handle is mounted to swing on the pivot pin. Scissor action results as a pivot rod transfers the applied moment caused by squeezing the handles down through the other blade to the cutting edge of the other blade extending beyond the handle and rotates with respect to the V-shaped blade. When the grip applied to the handles is relaxed, a spring connecting one end of the pivot rod with the neck of the V-shaped blade assists in reopening the blades. The curl formed in the cut material, and particularly cut metal, caused by shearing action of the blades may be reversed simply by swinging the pivot handle 180 degrees about the pivot pin. This feature also permits the operator to align his line-of-sight with a straight cutting edge thereby allowing "right-hand" cuts when the operator desires to cut out a section of material to his right and "left-hand" cuts when the section is to his left.

Additional objects and features of the present invention will become apparent from the following detailed description taken together with the drawings.

DRAWINGS

FIG. 1 is a side elevation view of one embodiment of the shears of the present invention arranged for use in making right-hand cuts;

FIG. 2, a similar side view showing the rotating handle rotated through a 180 degree arc;

FIG. 3, still another side view with the rotating handle shown as arranged for use in making left-hand cuts; and FIG. 4, a fragmentary top plan view of the shears as in FIG. 1.

DETAILED DESCRIPTION

Figure 1:
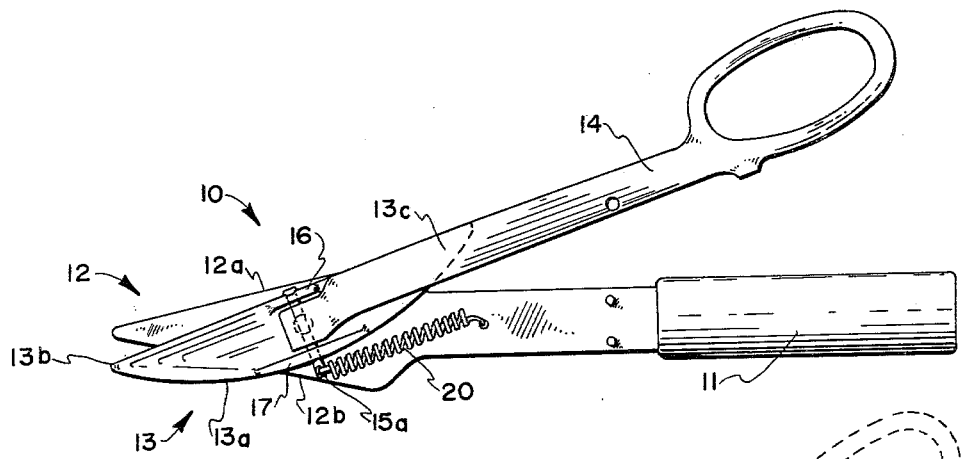

FIGS. 1-4 show different arrangments of a presently preferred embodiment of the shears of the present invention. The shears, shown generally at 10, comprise a handle 11 with a V-shaped blade 12 on one end that is arranged to provide scissor action with another blade 13 to which a pivotting handle 14 is attached. The V-shaped blade 12 has two cutting edges 12a and 12b on each side thereof and terminating at a common tip of the blade while the other blade 13 has a curved, non-cutting edge 13a and two aligned, straight cutting edges 13b and 13c. The pivoting handle 14 is free to swing through a 180 degree arc on a pivot pin 15 that extends between two spaced-apart ears 16 and 17 and that project from a face of the other blade. The ears 16 and 17 are rigidly attached centrally of the blade 13 with ear 17 positioned adjacent to curved edge 13a and 16 positioned adjacent to the continuous edge formed by aligned cutting edges 13b and 13c, respectively, of the blade 13. The blade 13 and the V-shaped blade 12 provide scissor action about a pin 18, shown best in FIG. 4. The pin 18 is preferably a bolt or screw-type pin, permitting the operator to tighten or dismember the blades as desired.

Figure 2:
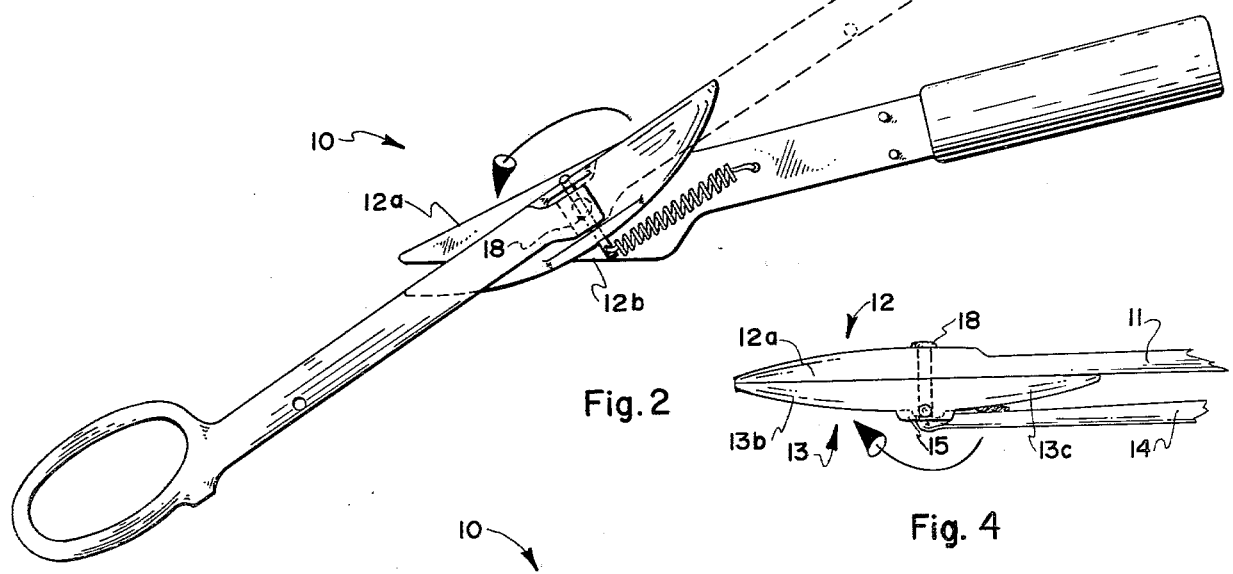
Figure 4:
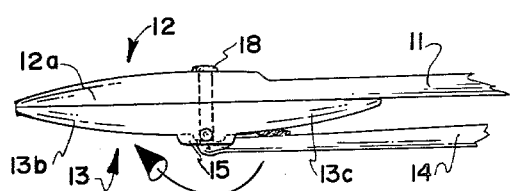
Figure 3:
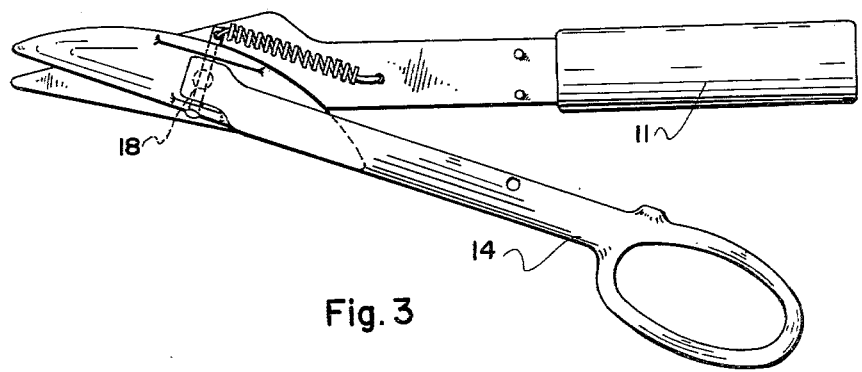

In use, simultaneous squeezing of the handle 11 and pivoting of handle 14, when it is in one of its extreme positions, creates a concentrated moment on the pivot pin 15. The moment is transferred through the ears 16 and 17 to the blade 13 to rotate it about the pin 18 and to cause whichever cutting edge 13b or 13c projects beyond handle 14 to cooperate in scissor fashion with one cutting edge 12a or 12b of the blade 12. When the pivoting handle 14 is rotated 180 degrees to its other extreme position, the other cutting edge 13b or 13c of the blade 13 then cooperates in scissor fashion with the other cutting edge 12a or 12b of blade 12. When the squeezing grip on the handles 11 and 14 is relaxed, a spring 20 connecting one end 15a of the pivot pin 15 with the handle 11, assists in separating the blades of the shears 10. The curl in cut metal or other material caused by shearing action of the blades 12 and 13 may be reversed by swinging the pivoting handle 14 through a 180 degree arc as best shown in FIG. 2. Furthermore, the operator may pivot the handle 14 in order to align his line-of-sight with a straight cutting edge thereby facilitating right-hand or left-hand cuts.

Although a preferred form of my invention has been herein disclosed, it is to be understood that the present disclosure is by way of example and that variations are possible without departing from the subject matter coming within the scope of the following claims, which subject matter I regard as my invention.

I claim:

1. Reversible shears comprising
   a first blade having one flat surface and a generally V-shaped configuration with the legs of the V both providing cutting surfaces terminating at a common tip;

a second blade having one flat surface and a blade edge forming a first cutting edge and a second cutting edge;

means pivotally connecting the first and second blades whereby the flat surfaces of the first and second blades are in face-to-face engagement;

first handle means fixed to the first blade and forming a rigid continuation of said first blade at an edge remote from the common tip;

a pivot pin extending transversely to the first and second cutting edges of the second blade;

means mounting the pivot pin to a surface of the second blade remote from the flat surface thereof and at a location intermediate the first and second cutting edges;

and second handle means having one end thereof mounted to pivot around said pivot pin whereby when the second handle means is in one extreme pivoted position, it forms a handle for the first cutting surface of the second blade as said first cutting surface cooperates to provide a scissor cutting action with one cutting surface of the first blade during movment of the handles relative to one another and when the second handle means is in a second extreme position, it forms a handle for the second cutting surface of the second blade as it cooperates to provide a scissor cutting action with the other cutting surface of the first blade.

2. Reversible shears as in claim 1, further including spring means interconnecting the first handle and the second blade, whereby the cooperating cutting surfaces and cutting edges are biased apart.

3. Reversible shears as in claim 2, wherein the spring means includes a spring connected to the pivot pin and to the first handle.

* * * * *